(12) United States Patent
Jeong

(10) Patent No.: US 8,683,015 B2
(45) Date of Patent: Mar. 25, 2014

(54) METHOD AND APPARATUS FOR PROVIDING CONTENT IN MOBILE TERMINAL

(75) Inventor: Bong Soo Jeong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 209 days.

(21) Appl. No.: 13/299,861

(22) Filed: Nov. 18, 2011

(65) Prior Publication Data

US 2012/0131150 A1    May 24, 2012

(30) Foreign Application Priority Data

Nov. 18, 2010    (KR) .................. 10-2010-0114901

(51) Int. Cl.
*G06F 15/16*    (2006.01)
(52) U.S. Cl.
USPC ............ 709/219; 709/200; 709/217; 709/218
(58) Field of Classification Search
USPC ................................ 709/200, 217, 218, 219
See application file for complete search history.

(56) References Cited

U.S. PATENT DOCUMENTS

| | | | |
|---|---|---|---|
| 2003/0028379 A1* | 2/2003 | Wendt et al. .................. | 704/260 |
| 2007/0011011 A1* | 1/2007 | Cogliano ...................... | 704/272 |
| 2009/0248533 A1* | 10/2009 | Colemen et al. ............... | 705/26 |
| 2009/0288002 A1* | 11/2009 | Hamilton et al. ............. | 715/706 |
| 2010/0083112 A1* | 4/2010 | Dawson et al. ............... | 715/706 |
| 2012/0038667 A1* | 2/2012 | Branson et al. ............... | 345/632 |

* cited by examiner

*Primary Examiner* — Liangche A Wang
(74) *Attorney, Agent, or Firm* — The Farrell Law Firm, P.C.

(57) ABSTRACT

A method and apparatus for providing users with electronic book (e-book) content by means of a mobile terminal is provided. The method includes receiving an e-book from a provider server; transmitting a character request message containing identity information of the e-book to the provider server; receiving character information corresponding to the identity information from the provider server; displaying a character according to the character information; and outputting, when a page having a link to an event, the event by means of the character. A user may enjoy various activities such as collecting characters, promoting character level, and uploading character as well as reading e-books.

10 Claims, 17 Drawing Sheets

METHOD AND APPARATUS FOR PROVIDING CONTENT IN MOBILE TERMINAL

PRIORITY

This application claims priority under 35 U.S.C. §119(a) to an application filed in the Korean Intellectual Property Office on Nov. 18, 2010 and assigned Serial No. 10-2010-0114901, the entire disclosure of which is incorporated herein by reference.

BACKGROUND OF THE INVENTION

1. Field of the Invention

The present invention relates generally to a mobile terminal and, more particularly, to a method and apparatus for providing users with e-book content by means of a mobile terminal.

2. Description of the Related Art

With widespread use, mobile terminals have become an essential everyday item in modern life. The mobile terminal has evolved from a simple voice communication device to a multimedia communication device additionally supporting various data transmission and other supplementary services.

As the Electronic Book (e-book) functionality is becoming one of the supplementary functions of recent mobile terminals, the use of e-book content has been increasing. Particularly, with the advent of portable terminals with larger displays than the mobile communication terminals, such as tablet PCs, various technologies are being developed with e-book functionality. In the e-book field, recent research focuses on how to improve user convenience and entertainment features as well as the basic display of the content.

SUMMARY OF THE INVENTION

The present invention has been made in view of the above problems and provides a method and apparatus for providing the user with e-book content in a mobile terminal that allows the user enjoy additional entertainment features in addition to the content itself.

It is another object of the present invention to provide a content provision system for supporting the e-book content provision method.

In accordance with an aspect of the present invention, a method for providing content in a mobile terminal includes receiving an e-book from a provider server; transmitting a character request message containing identity information of the e-book to the provider server; receiving character information corresponding to the identity information from the provider server; displaying a character according to the character information; and outputting, when a page having a link to an event, the event by means of the character.

In accordance with another aspect of the present invention, a method for providing content in a system including a provider server, an e-book content database, a character database, and a mobile terminal, includes requesting, by the mobile terminal, the provider server for an e-book; transmitting, by the provider server, the e-book retrieved in the e-book content database to the mobile terminal; transmitting, by the mobile terminal, a character request message containing identity information of the e-book to the provider server; transmitting, by the provider server, character information corresponding to the identity information to the mobile terminal, the character information being retrieved from the character database; and displaying, when the e-book is executed, a character according to the character information.

In accordance with another aspect of the present invention, a content provision system includes an e-book database which stores a plurality of e-books having unique identity information, respectively; a character database which stores a plurality of characters having the identity information of the e-books, respectively; a provider server which sends a recipient an e-book requested by the recipient and retrieved from the e-book database and a character information corresponding to the identity information, which is transmitted by the recipient, and retrieved from the character database; and a mobile terminal which downloads the e-book from the provider server, sends the provider server a character request message including the identity information of the downloaded e-book, displays, when the e-book is executed, a character indicated by the character information received from the provider server, and presents supplementary information by means of the character.

In accordance with another aspect of the present invention, a method for providing content in mobile terminal, includes creating a character; receiving an e-book from a provider server; analyzing property information of the e-book; transforming the character according to the property information; animating the character according to a reading status of the e-book and whether reading the e-book finishes.

DETAILED DESCRIPTION OF EMBODIMENTS OF THE PRESENT INVENTION

The mobile terminal of the present invention can be any of mobile communication terminals such as a Code Division Multiple Access (CDMA) terminal, Wideband Code Division Multiple Access (WCDMA) terminal, and Global System for Mobile communications (GSM) terminal, and other portable terminals such as Portable Multimedia Player (PMP), MP3, and e-book reader.

Figure 1:
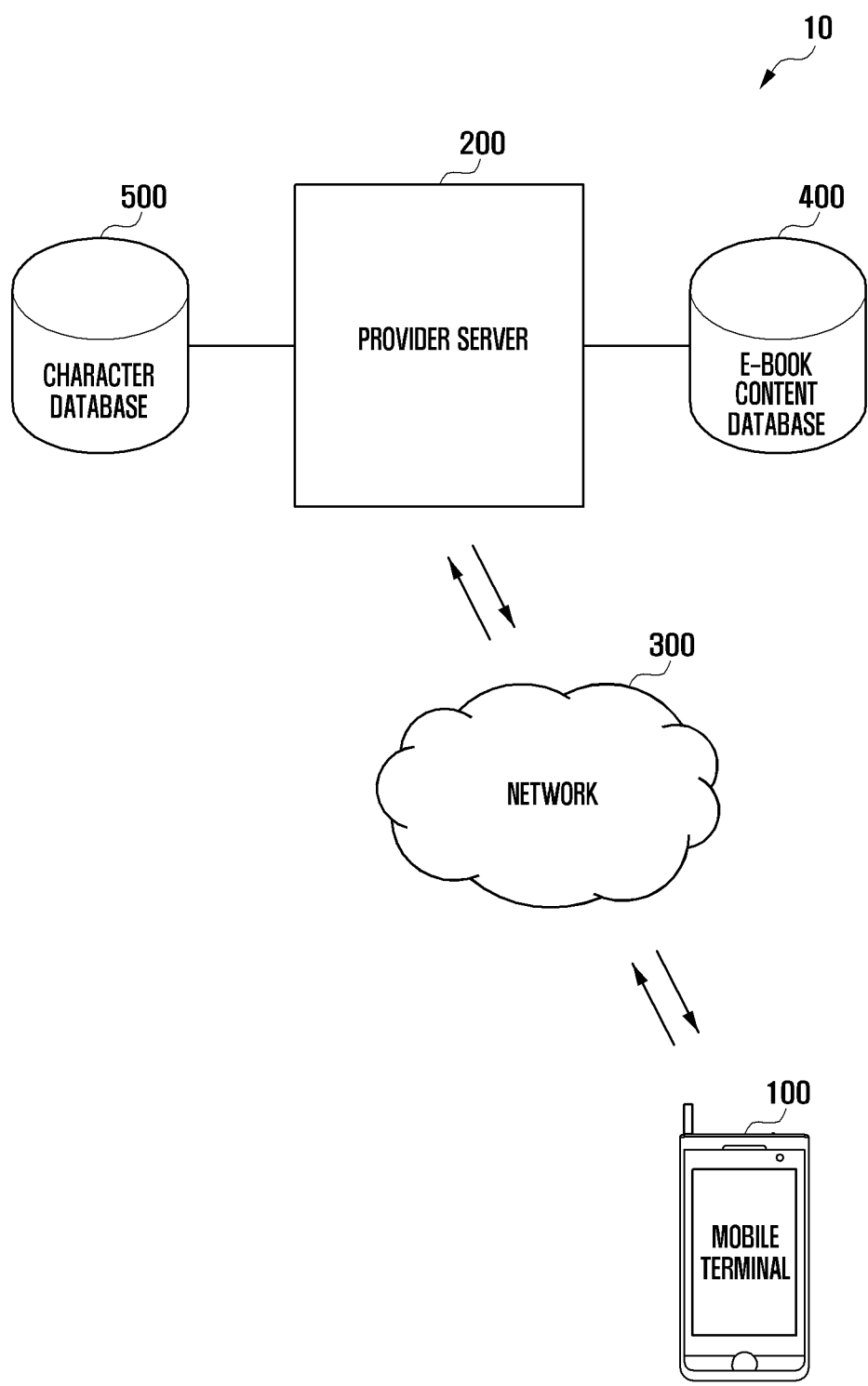
FIG. 1 is a diagram illustrating architecture of a content provision system 10 according to an embodiment of the present invention.

FIG. 1 is a diagram illustrating architecture of a content provision system 10 according to an embodiment of the present invention.

The content provision system 10 includes a mobile terminal 100, a provider server 200, a network 300, an e-book database 400, and a character database 500.

The mobile terminal 100 accesses the provider server 200 via the network 300 and sends the provider server 200 an e-book content request message. If the e-book content is received from the provider server 200, the mobile terminal 100 sends the provider server 200 a character request message with an identity number of the received e-book content. If character information is received from the provider server 200 in response to the character request message, the mobile terminal 100 displays a character according to the received character information. The mobile terminal 100 turns a page in response to a user input and, when a page having a link to a specific event, outputs the event by means of the character. The mobile terminal 100 also receives the information related to the previously received e-book content and displays information by means of the character. The mobile terminal 100 also can store the e-book content and the character separately in different storages to retain the character event when the e-book content is deleted.

The provider server 200 is the server responsible for transmitting the e-book content and the character information via the network 300. The provider server 200 is connected to the e-book content database 400 and the character database 500 so as to transmit the e-book content retrieved from the e-book content database 400 in response to the e-book content request message from the mobile terminal 100 and the character information corresponding to the identity information of the e-book content which is carried in the character request message transmitted by the mobile terminal 100. In case that the character information corresponding to the identity information is not stored in the character database 500, the provider server 200 sends the mobile terminal 100 a message notifying of the absence of requested character information. The mapping between the e-book content and the character can be made through negotiation between the e-book content provider and the mobile carrier and establishes the relationship between the e-book content and the character by incorporating the identity information of the e-book content in the metadata of the character information.

The network 300 is a component enabling connection between the mobile terminal 100 and the provider server 200. The network 300 can include Base Station, Base Station Controller, Mobile Switching Center, and apparatus for supporting packet data service (PDSN and SGSN). The Mobile Switching Center is connected to the provider server 200 and delivers the data received from the mobile terminal 100 to the provider 200 and the data received from the provider server 200 to the mobile terminal 100.

The e-book content database 400 is the storage for storing a plurality of e-book content. The e-book content is identified by unique identity numbers, and the identity number can be the International Standard Book Number (ISBN). According to an embodiment of the present invention, the e-book content has property information such as genre and field of the e-book.

The character database 500 is the storage for storing information on a plurality of characters. The character database 500 stores the character information in match with the identity information of the e-book content. When the character information is extracted from the character database 500, the provider server 200 retrieves the character information by referencing the identity information of the e-book content. According to an embodiment of the present invention, the character information can include the information on the property of the character itself and/or the e-book content having the link to the character.

Under the assumption of the above-structured content provision system 10, a description is made of the internal function blocks of the mobile terminal 100.

Figure 2:
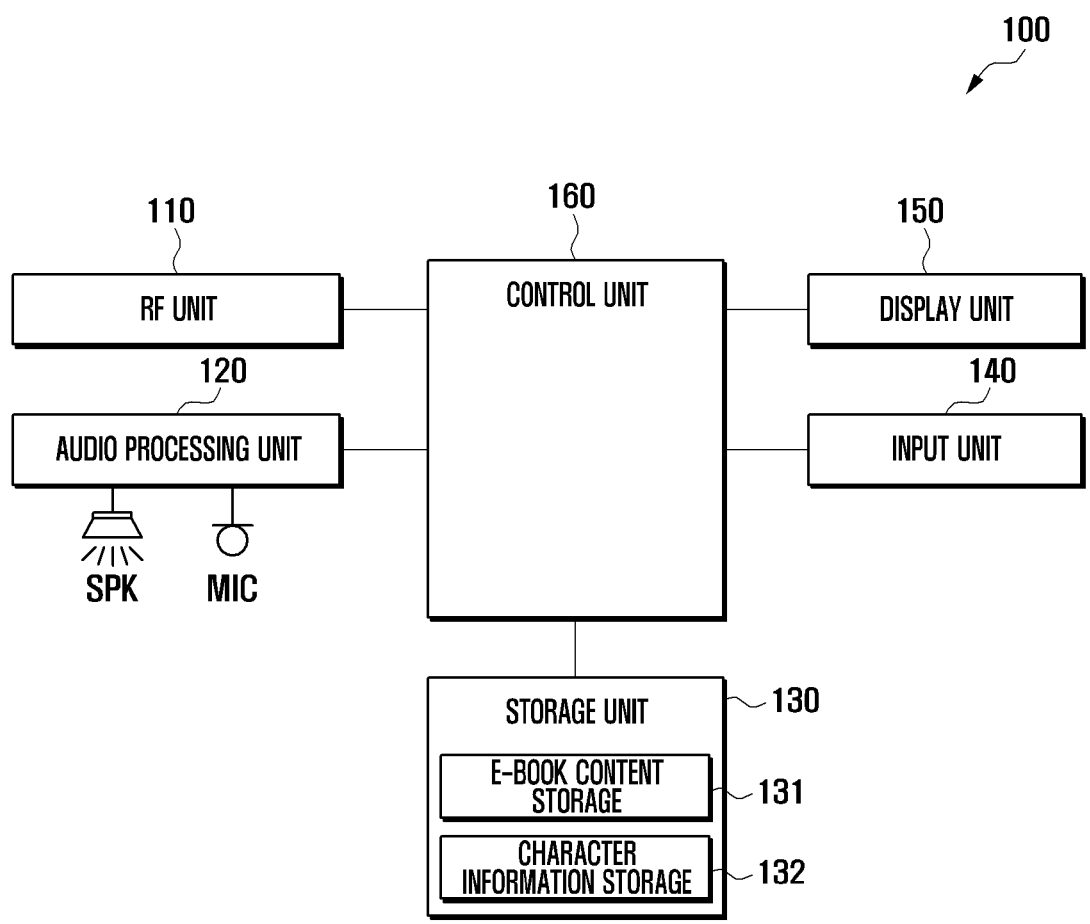
FIG. 2 is a block diagram illustrating a configuration of the mobile terminal of FIG. 1.

FIG. 2 is a block diagram illustrating a configuration of the mobile terminal of FIG. 1. According to an embodiment of the present invention, the mobile terminal 100 includes a Radio Frequency (RF) unit 110, an audio processing unit 120, a storage unit 130, an input unit 140, a display unit 150, and a control unit 160.

The RF unit 110 is responsible for radio communication of the mobile terminal to transmit/receive data. The RF unit 110 can include an RF transmitter for up-converting and amplifying a transmit signal and an RF receiver for low noise amplifying and down-converting a receive signal. The RF unit 110 also delivers the data received on the radio channel to the control unit 160 and transmits the data output by the control unit 160 over the radio channel. According to an embodiment of the present invention, the RF unit 110 transmits the e-book content request message to the provider server 200 and receives the e-book content from the provider server 200. The RF unit 110 also transmits the character request message containing the identity information of the e-book content to the provider server 200 and receives the character information from the provider server 200.

The audio processing unit 120 includes a codec pack, which is a set of data codec for processing packet data and an audio codec for processing audio signal including voice. The audio processing unit 120 converts a digital audio signal to an analog audio signal and converts the analog audio signal input through a microphone (MIC) into digital audio signal, by means of the audio codec.

The storage unit 130 stores programs and data necessary for operating the mobile terminal 100 and can be divided into a program region and a data region. The program region stores the programs for controlling overall operations of the mobile terminal 100, Operating System (OS) for booting up the mobile terminal, application programs necessary for playback of multimedia content, and supplementary application programs for executing optional functions of the mobile terminal 100 such as camera function, sound playback function, and still and motion pictures playback function. The data region stores the data such as image, video, phonebook, and audio file that are generated during the operations of the mobile terminal 100.

According to an embodiment of the present invention, the storage unit 130 includes an e-book content storage 131 and character information storage 132. The e-book content storage 131 stores the e-book content received from the provider server 200 with their unique identity information. According to an embodiment of the present invention, the e-book content includes property information such as genre and field.

The character information storage 132 stores the character information received from the provider server 200 along with the identity information of the e-book content. If an e-book is executed, the control unit 160 loads the e-book content data from the e-book content storage 131, retrieves the character information from the character information storage 132 by referencing the identity information of the executed e-book content, and displays the character information on the display unit 150. According to an embodiment of the present invention, the character information can include the properties of the character and/or the e-book content. When he e-book content supporting a character is stored in the e-book content storage 131, new character information is created in the character information storage 132.

The input unit 140 generates a key signal to the control unit 160 in response to a user's key manipulation for controlling the mobile terminal 100. The input unit 140 can be implemented with a keypad (such as a 3×4 keypad or a QWERTY keypad including a plurality of numeric keys, alphabetic keys, and navigation keys) or a touch panel. The input unit 140 also can include at least one of button key, jog key, and wheel key. The input unit 140 generates the input signal for executing an application related to the functions (such as call function, music playback function, video playback function, still image display function, e-book function, camera function, DMB playback function, and social network service function) to the control unit 100. According to an embodiment of the present invention, the input unit 140 can generates an input signal for requesting for e-book content download, e-book content execution, e-book content deletion, page turning, or character menu item selection to the control unit 160.

The display unit 150 can be implemented with one of a Liquid Crystal Display (LCD), an Organic Light Emitting Diodes (OLED), and an Active Matrix OLED (AMOLED) and provide the user with menu, input data, function setting information, and other indicative information in the form of visual data. The display unit 150 is responsible for outputting booting progress screens, standby screens, menu screens, call progress screens, and other application execution screens. According to an embodiment of the present invention, the display unit 150 displays the e-book content along with a character corresponding to the e-book content. The display unit 150 also displays an event linked to an event-linking page of the e-book content by means of the character.

The control unit 160 is responsible for controlling overall operations of the components of the mobile terminal 100. The control unit 160 controls the RF unit 110 to transmit the e-book content request message to the provider server 200 and receive the e-book content from the provider server 200, and the received e-book content is stored in the e-book content storage 131. The control unit 160 controls the RF unit 110 to transmits the character request message including identity information of the received e-book content to the provider server 200 and receive character information, and the received character information is store in the character information storage 132. When the e-book content is executed, the control unit 160 controls the display unit 150 to display the e-book content along with the character according to the received character information. When the current page of the e-book content is an event-linking page, the control unit 160 controls the display unit 150 to display an event by means of the character. If the information related to the e-book content from the provider server 200 by means of the RF unit 110, the control unit 160 controls the display 150 to output the e-book content-related information by means of the character. If a e-book content delete command is input by means of the input unit 140, the control unit 160 controls the display unit 160 to display a message asking whether to delete the character information, and deletes the character information from the character information storage 132 in response to a character information delete confirmation command input by means of the input unit 140 or retains the character information in the character information storage 132 in response to a character information delete reject command input by means of the input unit 140.

If a character list menu item is selected by means of the input unit 140, the control unit 160 analyzes property information in the character information, determines relationship of the individual characters in the character list, and controls the display unit 150 to display the characters by reflecting the relationships.

According to an embodiment of the present invention, the control unit 160 creates a unique character of the mobile terminal 100, transmits an e-book content request message to the provider server 200 by means of the RF unit 110, receives the e-book content from the provider server 200, and stores the received e-book content in the e-book content storage 131. The control unit 160 analyzes the property information of the received e-book content and controls the display unit 150 to display the character having an expression changing in accordance with the property information. When the e-book content is executed, the control unit 160 verifies the reading fulfillment of the user and, if the e-book content is read completely, upgrades the character. In the reading fulfillment verification process, the control unit 160 measures the time duration in which the page is opened, checks whether the time is longer than a threshold time duration, determines, if so, that the reading the corresponding page is valid, displays a specific item on the page, and, if a touch is made on the specific item accurately, determines that the corresponding page is read validly.

Figure 3:
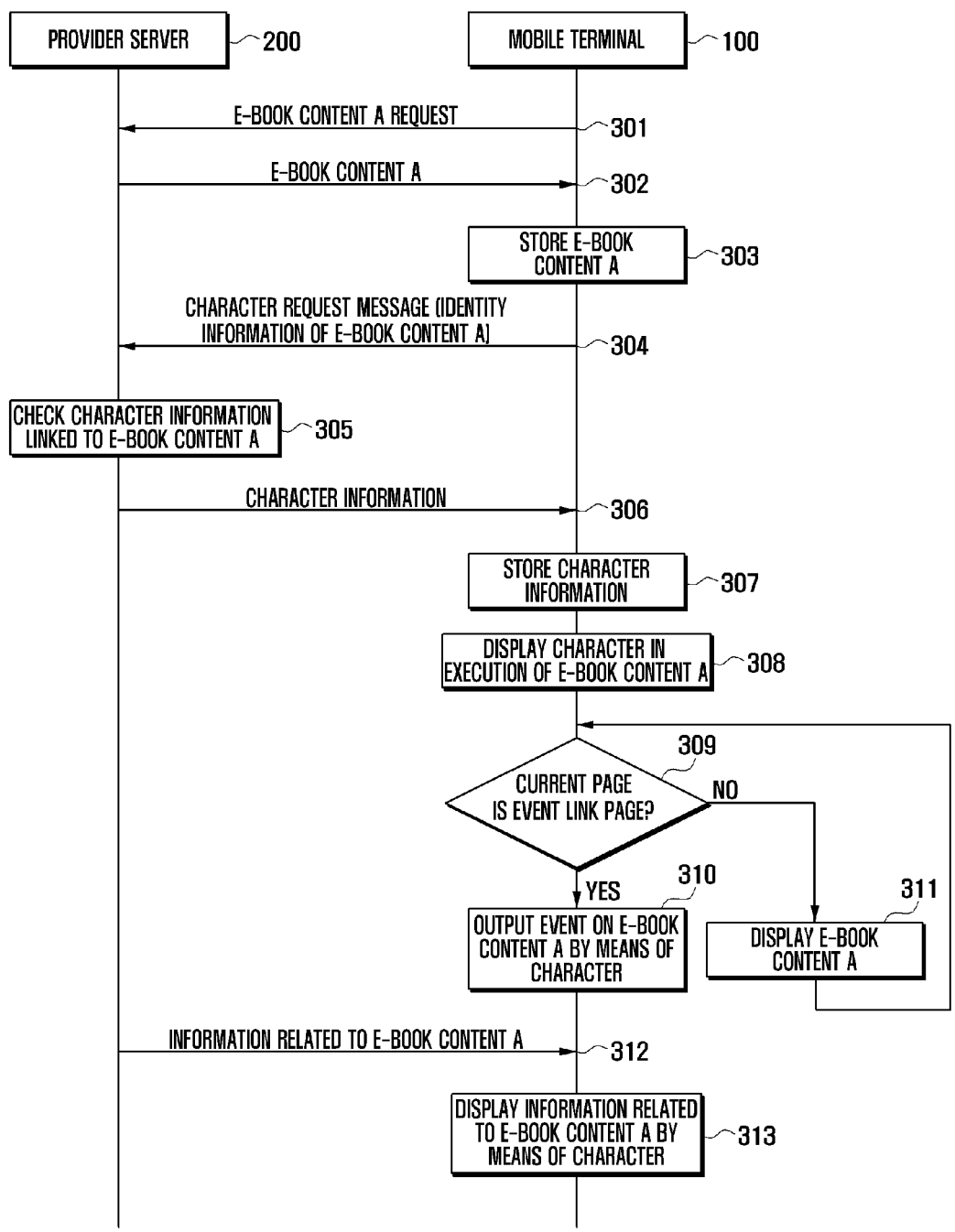
FIG. 3 is a signaling diagram illustrating message flows between the content provision server and the mobile terminal in the method for providing content according to an embodiment of the present invention.

FIG. 3 is a signaling diagram illustrating message flows between the content provision server 200 and the mobile terminal in the method for providing content according to an embodiment of the present invention.

Referring to FIG. 3, the mobile terminal 100 requests the provider server 200 for the e-book content A in step 301. The mobile terminal 100 accesses the provider server 200 to request for the e-book content list and, when the e-book content list is received from the provider server 200, transmits an e-book content request message to the provider server 200 for downloading the selected e-book content A.

Upon receipt of the e-book content request message, the provider server 200 delivers the requested e-book content A to the mobile terminal 100 in step 302. The provider server 200 retrieves the e-book content A from the e-book content database 400 and transmits the retrieved e-book content A to the mobile terminal 100.

The mobile terminal 100 receives the e-book content A and stores the received e-book content A in the internal storage in step 303. The mobile terminal 100 checks the identity information of the e-book content A and transmits a character request message containing the identity information of the e-book content to the provider server 200 in step 304.

The provider server 200 checks the identity information of the e-book content A which is transmitted by the mobile terminal 100 and determine whether the character information corresponding to the identity information of the e-book content A is stored in the character information database 132 in step 305. If the character information corresponding to the e-book content A, the provider server 200 retrieves the character information and transmits the retrieved character information to the mobile terminal 100 in step 306.

The mobile terminal 100 receives the character information from the provider server 200 and stores the received character information in step 307. Afterward, if the e-book content A is executed, the mobile terminal 100 displays the character according to the received character information in step 308.

According to an embodiment of the present invention, the mobile terminal 100 executes the e-book content A right after the complete download of the e-book content A and displays the execution screen of the e-book content A along with the character.

Whenever the user enters a page-turning command, the mobile terminal 100 displays the target page according to the page-turning command. Whenever the page is turned, the mobile terminal 100 determines whether the current page is an event-linking page in step 309. In the present invention, the event can be a quiz related to the e-book content A, writer's comment about the e-book content A, and reading progress status of the e-book content A.

If it is determined that the current page is an event-linking page at step 309, the mobile terminal outputs an event by means of the character while displaying the corresponding page of the e-book content A in step 310. For example, the mobile terminal 100 can display the character in an animation speaking the quiz or writer's comment. The mobile terminal 100 also can display the character in an animation speaking "60% has been read, now progress to the climax." for notifying of the reading progress status. If it is determined that the current page is not an event-linking page, the mobile terminal 100 display the corresponding pate of the e-book content A without any event in step 311.

The provider server 200 determines whether there is any update in the information on the e-book content A. The e-book content-related information can include the information about the newly published books of the writer of the e-book content A. if there is any update in the information on the e-book A, the provider server 200 transmits the updated information of the e-book content A to the mobile terminal 200 in step 312. That is, the provider server 200 transmits the updated information of the e-book content A to the mobile terminal 100 in push mode. Upon receipt of the updated information of the e-book content A, the mobile terminal 100 displays the updated information of the e-book content A by means of the character in step 313. For example, the mobile terminal 100 displays the character in animation speaking the information on the newly published book of the writer.

A description is made of the method for providing content in the content provision system in view of the mobile terminal 100 hereinafter.

Figure 4:
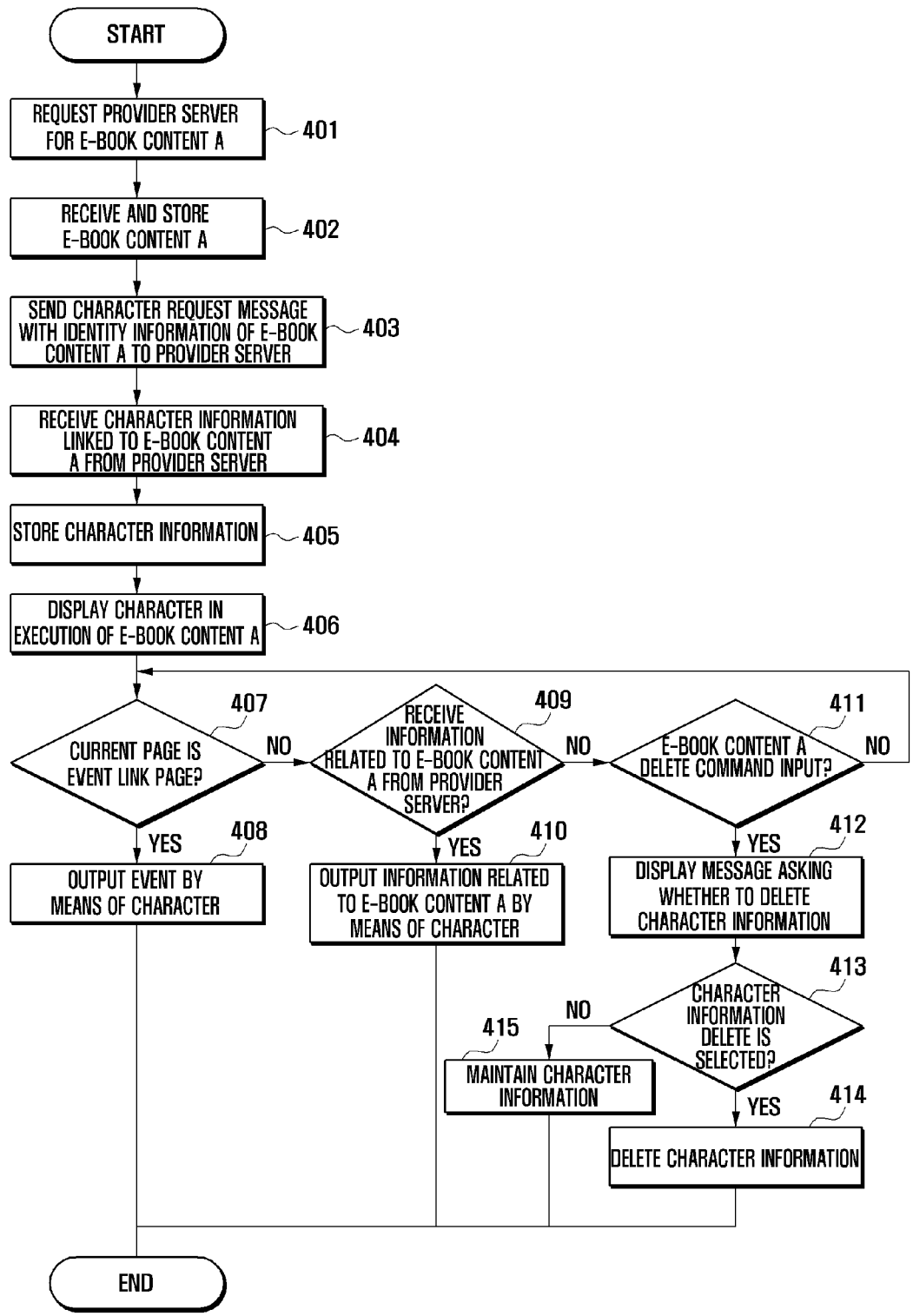
FIG. 4 is a flowchart illustrating a method for providing content by means of the mobile terminal according to an embodiment of the present invention.

FIG. 4 is a flowchart illustrating a method for providing content by means of the mobile terminal according to an embodiment of the present invention.

The control unit 160 controls the RF unit 110 to request the provider server 200 for the e-book content A in step 401. The control unit 160 receives an e-book content A download command input by means of the input unit 140 and transmits the e-book content A request message to the provider server 200 by means of the RF unit 110.

The control unit 160 receives the e-book content A from the provider server 200 by means of the RF unit 110 and stores the received e-book content A in the e-book content storage 131 in step 402.

After checking the identity information of the e-book content A, the control unit 160 generates the character request message containing the identity information and transmits the character request message to the provider server 200 by means of the RF unit in step 403. In the present invention, the identity information of the e-book content A can be an International Standard Book Number in step ISBN.

The control unit 160 receives the character information linked to the e-book content A from the provider server 200 by means of the RF unit 110 in step 404 and stores the character information in the character information storage 132 in step 405.

If the e-book content A is executed, the control unit 160 controls the display unit 150 to display the corresponding page of the e-book content A along with the character according to the received character information. When the character appears firstly, the control unit 160 controls the display unit 15 to display the character in animation of greeting.

FIGS. 6A to 6E are diagrams illustrating execution screens of an e-book content according to an embodiment of the present invention.

Figure 6A:
FIGS. 6A to 6E are diagrams illustrating execution screens of e-book content according to an embodiment of the present invention.

FIG. 6A shows an initial execution screen of the e-book content. The e-book content is entitled 'Wizard in Wonderland' as displayed at the center of the screen. At the bottom left corner of the screen, the character corresponding to the 'Wizard in Wonderland' is displayed in animation speaking 'welcome'. That is, when the character appears for the first time, the control unit 160 controls such that the greeting word is displayed along with the character.

According to an embodiment of the present invention, when the e-book content A is received by means of the RF unit 110, the control unit 160 executes the e-book content A to display a page of the e-book content A by means of the display unit 150 and, when the character information corresponding to the e-book content A is received by means of the RF unit 110, displays the character by means of the display unit 150 according to the received character information.

The control unit 160 determines whether a page-turning command is input by the user through the input unit 140 and, if a page-turning command is input, controls the display unit 150 to turn the page.

In FIG. 4, the control unit 160 determines whether the current page is an event-linking page in step 407. In the present invention, the event can be a quiz related to the e-book content A, writer's comment about the e-book content A, and reading progress status of the e-book content A. If it is determined that the current page is an event-linking page at step 407, the control unit 160 controls the display unit 150 to output an event by means of the character in step 408. For example, the control unit 160 can control the display unit 150 to display the character in an animation speaking the quiz, writer's comment, or reading progress status.

Figure 6B:
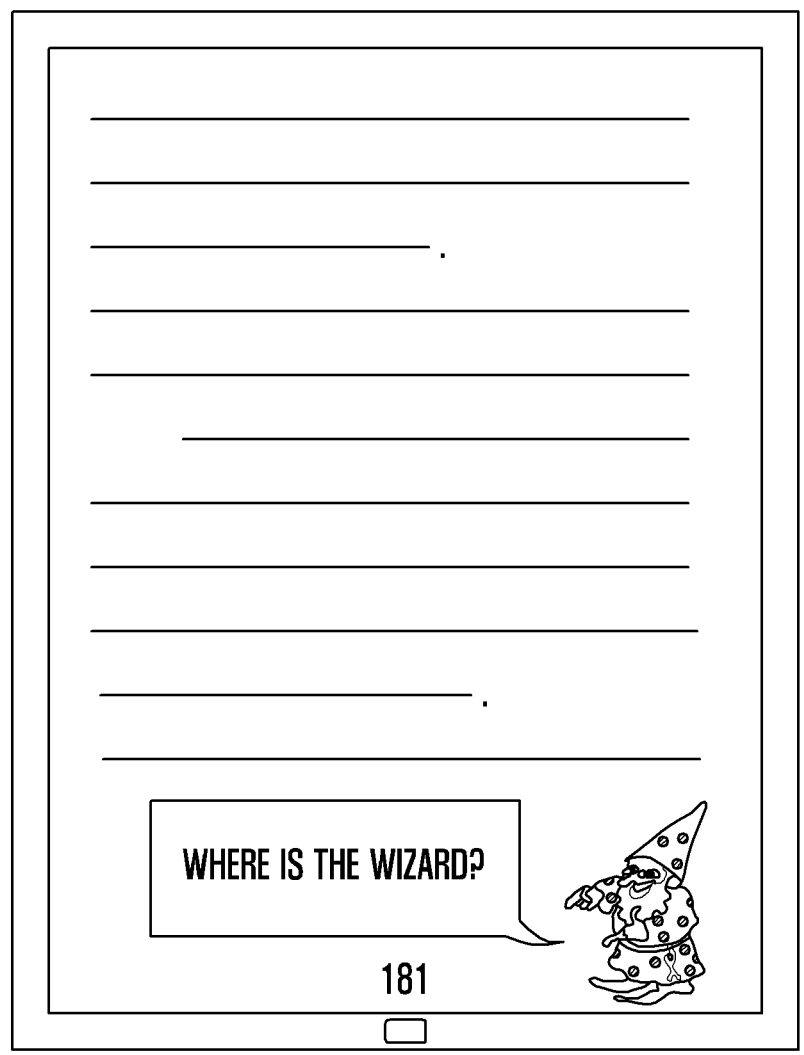

FIG. 6B shows the e-book execution screen where an event-linking page of the e-book content is presented. At the bottom left corner of the screen, the character is displayed along with the balloon text "Where is the Wizard now?" If a touch is made to the text balloon, a text box is presented such that the user can enter the answer. Whether the answer entered by the user is correct can be used to verify the completion of reading the e-book content "Wizard in Wonderland."

If it is determined that the current page is not an event-linking page at step 407 of FIG. 4, the control unit 160 determines whether the information related to the e-book content A is received by means of the RF unit 110 in step 409. Whenever the information on the e-book content A is updated in step such as new news or article on the e-book content A, the provider server 200 transmits the information to the mobile terminal 100. If the information related to the e-book content A is received by means of the RF unit 110, the control unit 160 controls the display unit 150 to display the information related to the e-book content A by means of the character in step 410.

Figure 6C:
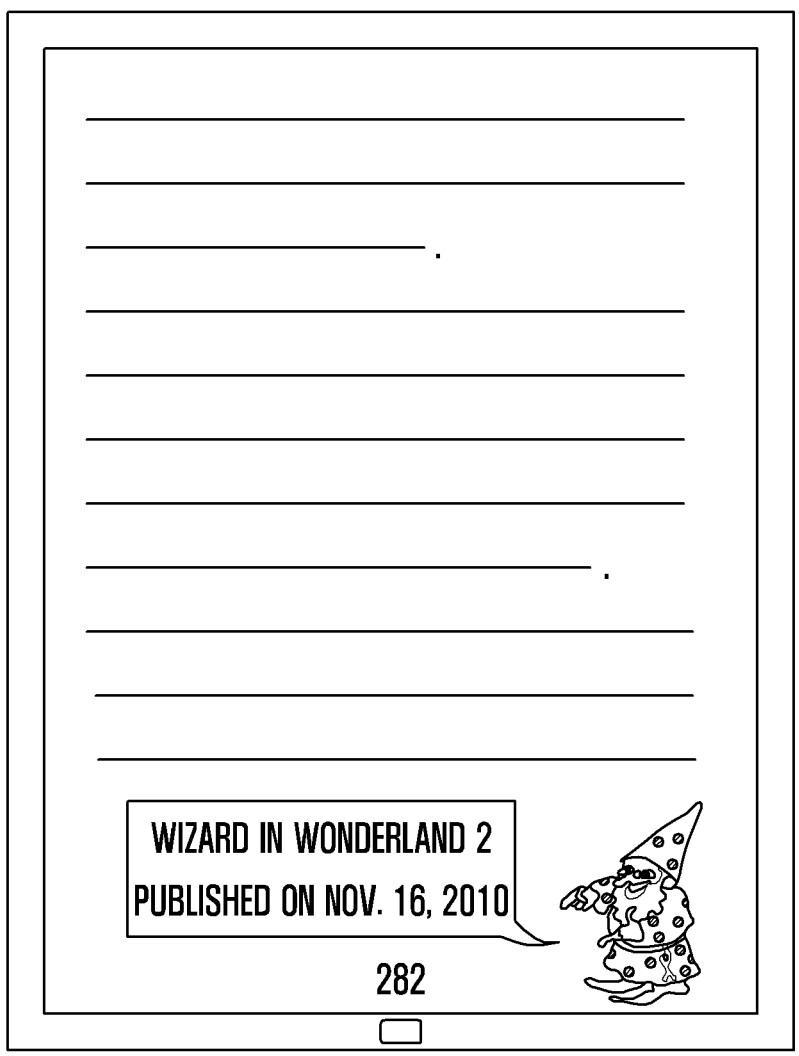

FIG. 6C shows the e-book execution screen in which the e-book content-related information is presented by means of the character in animation speaking the publication news of 'Wizard in Wonderland 2'.

If the information related to the e-book content A is not received at step 409, the control unit 160 determines whether a delete command for deleting the e-book content A is input in step 411.

If the delete command for deleting the e-book content A is input, the control unit 160 controls the display unit 150 to display a message asking whether to delete the character information in step 412. If a command for deleting character information is input, the control unit 160 deletes the corresponding character information from the character information storage 132 in step 414 and, otherwise if a command for retaining the character information is input, maintains the corresponding character information in the character information storage 132 in step 415.

According to an embodiment of the present invention, even when the e-book content A is not executed, the control unit 160 can control the display unit 150 to output the event related to the e-book content A. for example, the control unit 160 controls the display unit 150 such that the character appears on the standby mode screen and shows the time elapsed after the final reading of the e-book content A.

Figure 6D:
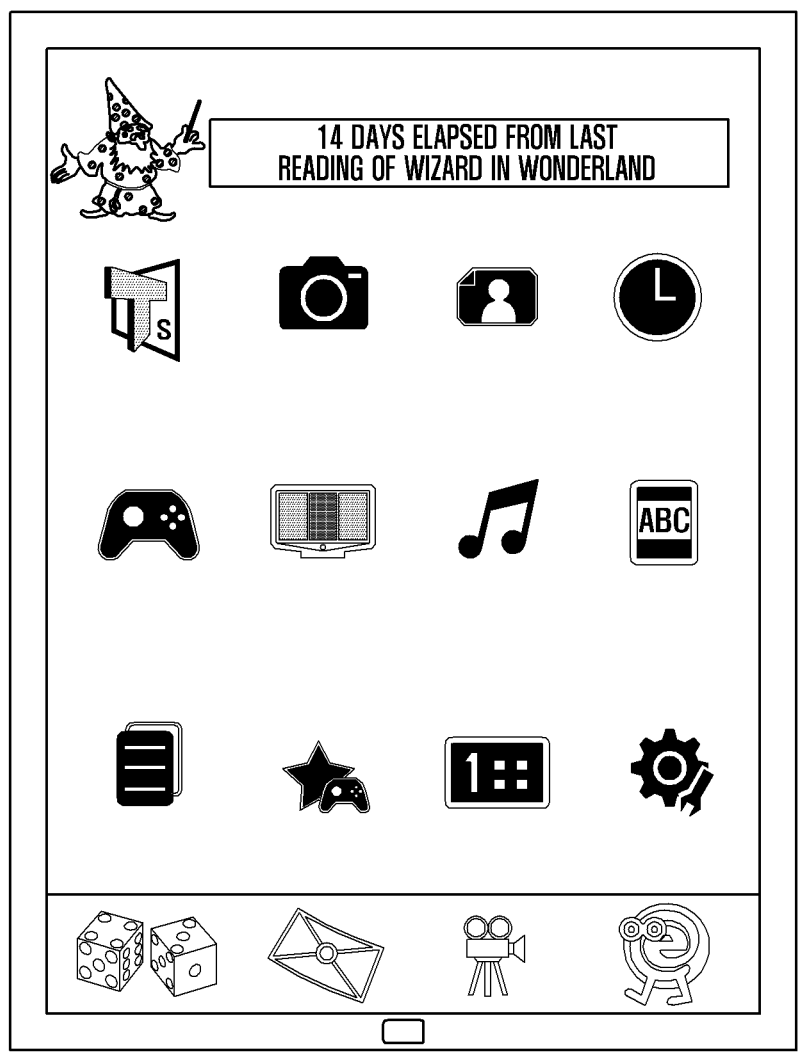

FIG. 6D shows the e-book execution screen on which the event related to the e-book content A in the state where the e-book content A is not executed. In FIG. 6D, the home screen is displayed along with the character presenting an alarm text 'elapsed 14 days after the final reading of the Wizard in Wonderland'. Such an alarm text can give the user a motivation to read the 'Wizard in Wonderland'.

According to an embodiment of the present invention, the mobile terminal 100 can be provided with a character list menu. The character list menu is the menu allowing the user to collect and manage the characters of the read e-book content. The user can check the collected characters by means of the character list menu.

Figure 5:
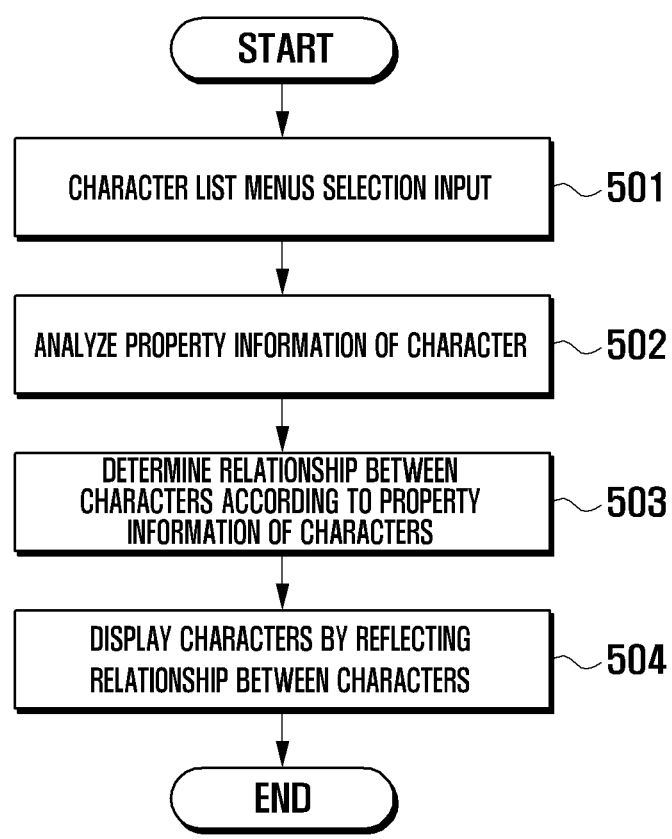
FIG. 5 is a flowchart illustrating a procedure for displaying the character list in the mobile terminal according to an embodiment of the present invention.

FIG. 5 is a flowchart illustrating a procedure for displaying the character list in the mobile terminal according to an embodiment of the present invention.

The control unit 160 receives a character list menu selection command input by means of the input unit 140 in step 501. The mobile terminal 100 according to an embodiment of the present invention is provided with the character list menu. The character list menu is the menu for the user to manage the characters created according to the character information received from the provider server 200. The character list menu can be provided as an item of the main menu of the mobile terminal 100 or a submenu of an e-book application menu.

Once the character list menu is selected, the control unit 160 analyzes the property information of the character information stored in the character information storage in step 502. In the present invention, the property information of the character information can be the information related to the property of the character itself or the property of the corresponding e-book content. For example, the property information of the Wizard character can include the properties such as 'fantasy' and 'wizard in step good' or 'fantasy' and 'monster in step evil'. That is, both the information related to the character itself and the information related to the corresponding e-book content can be included in the property information of the character information.

The control unit 160 determines the relationship between the characters according to the property information of the analyzed character in step 503. The control unit 160 determines the relationship between the characters according to all of the character information stored in the character information storage 132. The characters stored in the character information storage 132 can have similar property information or opposite property information. The control unit 160 determines familiarity between the characters using the property information of the character information. For example, the wizard character and the monster character have totally opposite properties of good and evil such that the control unit 160 assigns a very low intimacy between the two characters. If there are two wizard characters having the property 'good' in the character information storage 132, the control unit 160 assigns a high intimacy between the two wizard characters.

Next, the control unit 160 controls the display unit 150 to display the characters by reflecting the relationship between the characters in step 504. For example, the control unit 160 controls the display unit 150 to display the wizard character and the monster character in fighting state or intimate state.

Figure 6E:
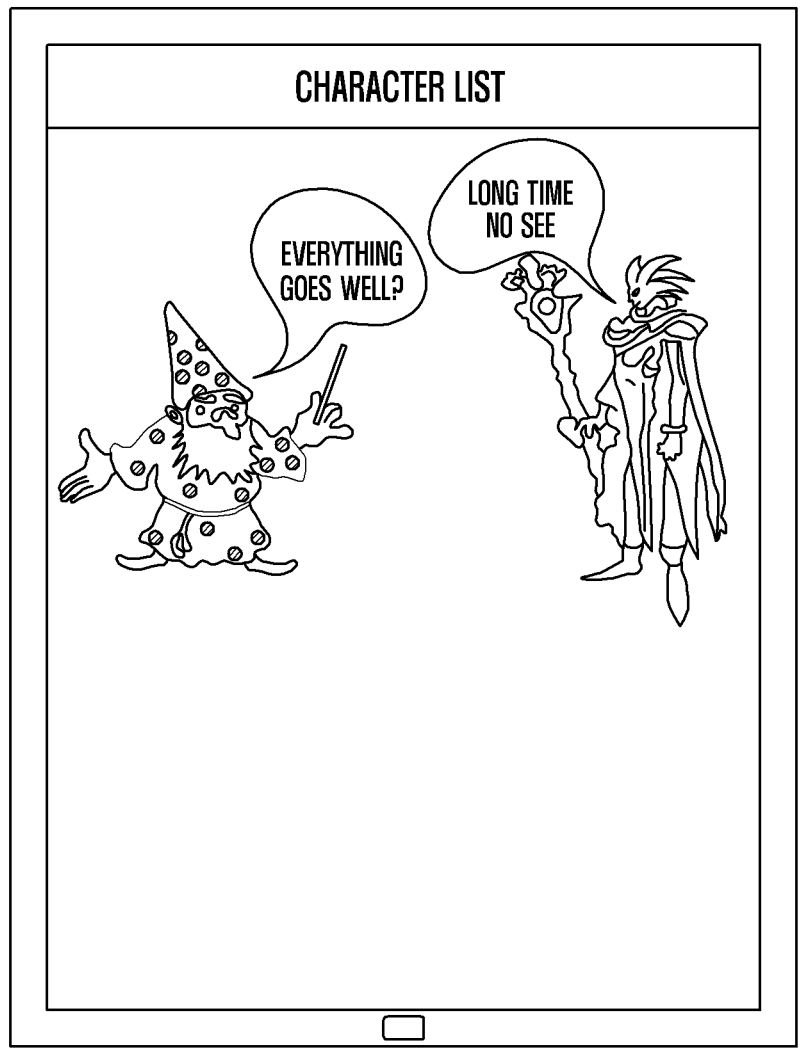

FIG. 6e shows the e-book execution screen in which an character list menu is presented. The character list menu of FIG. 6e includes two wizard characters. The two wizards are facing with each other, one saying "everything goes well?" and the other saying "long time no see." Since the two wizards have the similar property information, their intimacy is higher and, therefore, the control unit 160 controls the display unit 150 to display the two wizard characters going well with each other. In case that the character list menu includes the monster character opposite to the wizard character in property, the control unit 160 controls the display unit 150 to display the wizard character and the monster character in fight.

Figure 7:
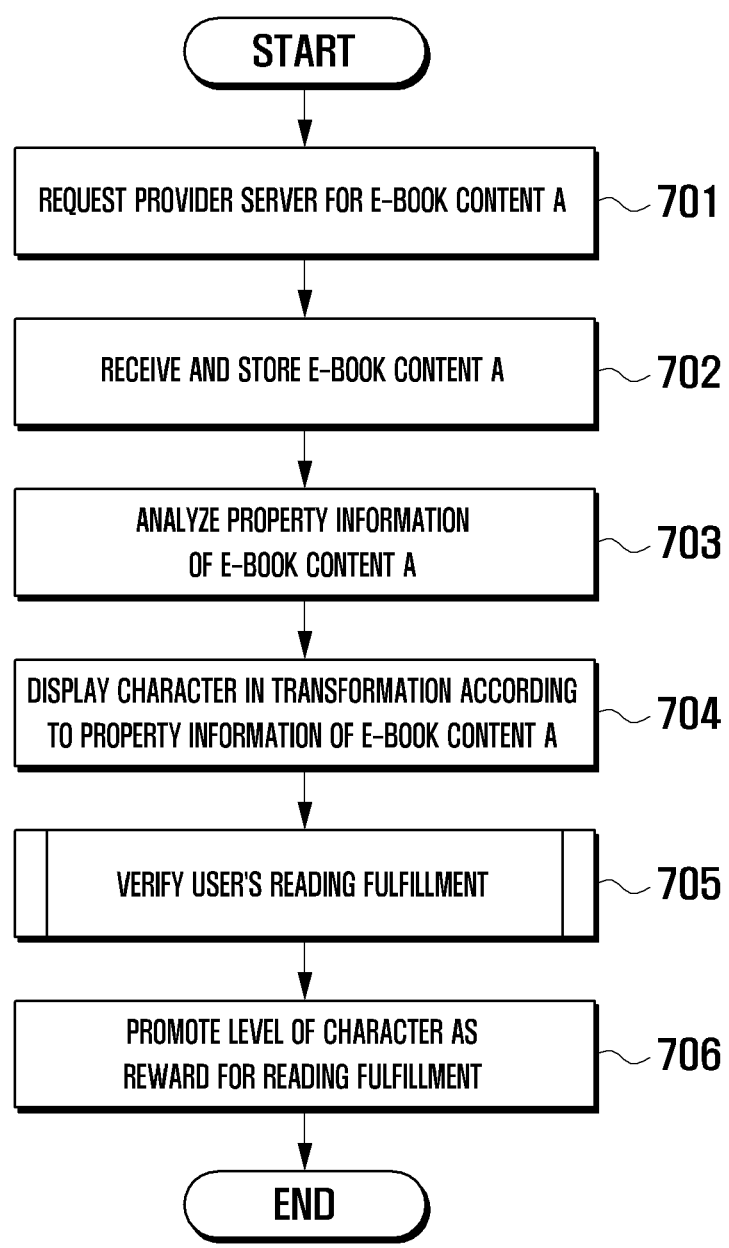
FIG. 7 is a flowchart illustrating a procedure for displaying the character list in the mobile terminal according to an embodiment of the present invention.

FIG. 7 is a flowchart illustrating a procedure for displaying the character list in the mobile terminal according to an embodiment of the present invention. The embodiment of FIG. 7 is distinguished from the content provision method of the content provision system 10 depicted in FIG. 3 and is characterized in that a unique character is created in the mobile terminal 100. A character or an avatar can be created using the data included in the manufacturing stage of the mobile terminal 100 or by executing a character creation program in step wizard installed by the user. The character creation program can create a character based on the information such as sex, age, hobby, and interest input by the user. The procedure of FIG. 7 begins in the state where a character is created in the mobile terminal 100.

The control unit 160 requests the provider server 200 for the e-book content A in step 701. If the user inputs the e-book content A download command by means of the input unit 140, the control unit 160 controls the RF unit 110 to transmit the e-book content A request message to the provider server 200.

The control unit 160 receives the e-book content A from the provider server 200 by means of the RF unit 110 and stores the received e-book content A in the e-book content storage 131 in step 702.

The control unit 160 analyzes the property information of the e-book content A in step 703. According to an embodiment of the present invention, the property information can include category information of the e-book content such as genre and field.

Next, the control unit 160 controls the display unit 150 to display the previously store character by reflecting change caused according to the property information of the e-book content A in step 704. If the e-book content A is executed, the control unit 160 displays the e-book along with the character which is changed in shape according to the property information of the e-book content A. For example, if the e-book content A including property information 'fantasy' is executed, the control unit 160 controls the display unit 150 to display the character in the shape of a wizard character.

Figure 11A:
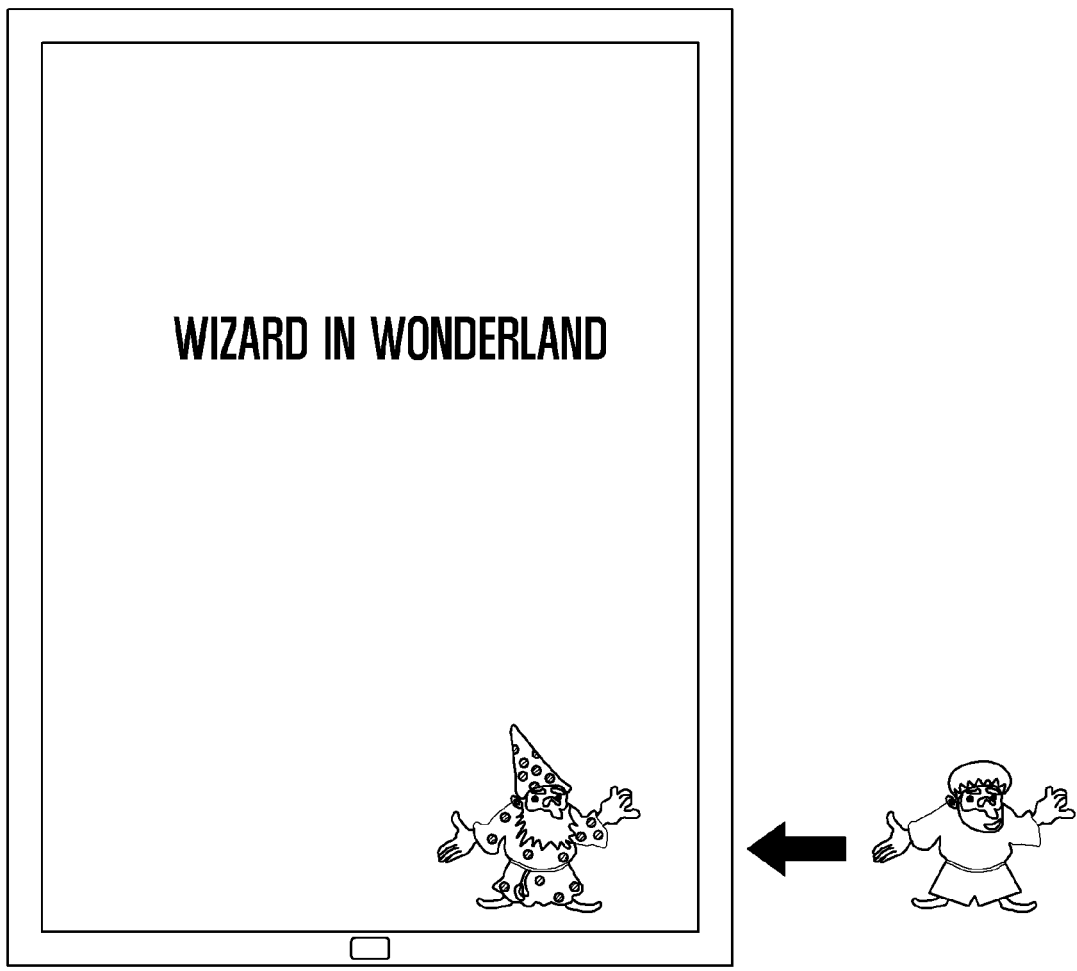
FIGS. 11A to 11C are diagrams illustrating execution screens of e-book content according to another embodiment of the present invention.

FIG. 11A shows an initial execution screen of the e-book content A. The e-book content A is entitled 'Wizard in Wonderland' as displayed at the center of the screen. At the bottom left corner of the screen, the wizard character is displayed. The wizard character is displayed as a replacement of the character stored originally.

If the user inputs a page turning command, the control unit 160 controls the display unit 150 to display the next page. At this time, the control unit 160 checks the user's reading fulfillment per page in step 705. According to an embodiment of the present invention, the user's reading fulfillment is used to determine whether the user turns the page after perusal. The control unit 160 can determine the user's reading fulfillment of the e-book content A based on the user's reading fulfillment of some or entire pages of the e-book content A.

Figure 11B:
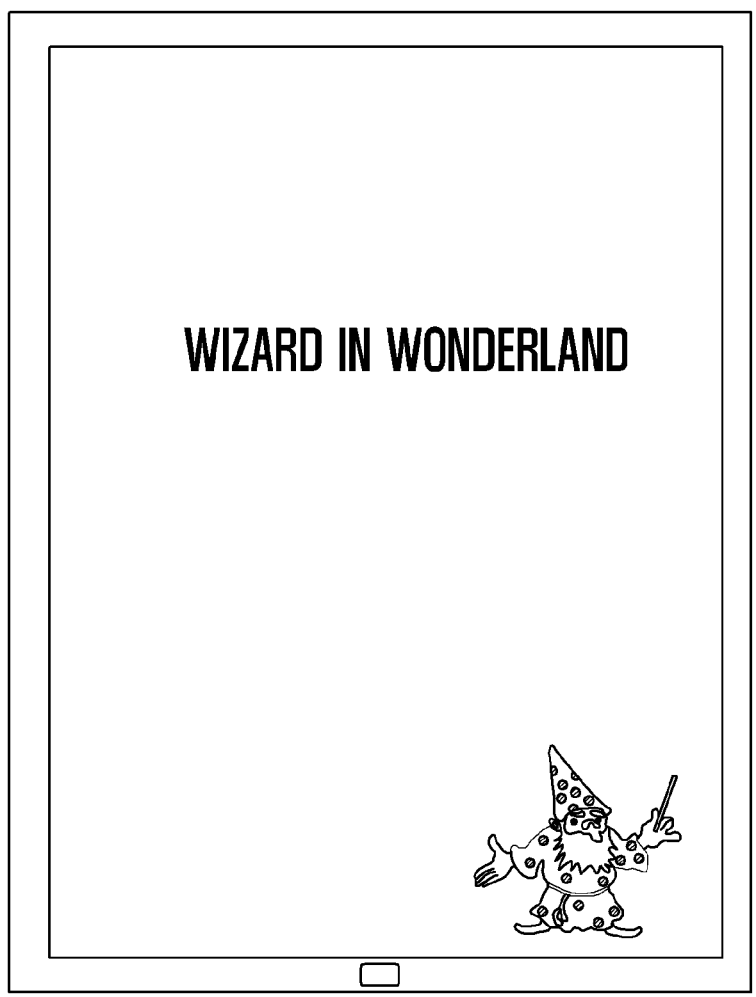

If it is determined that the user has read the e-book content A completely, the control unit 160 promotes the level of the character in step 706. At this time, the control unit controls the display unit 150 to display the character of which level is promoted. FIG. 11b shows the execution screen of the e-book content A in which the character is promoted. When the user starts reading 'Wizard of Wonderland 2' after finishing the 'Wizard of Wonderland', the wizard character is promoted to have a wand.

Figure 8:
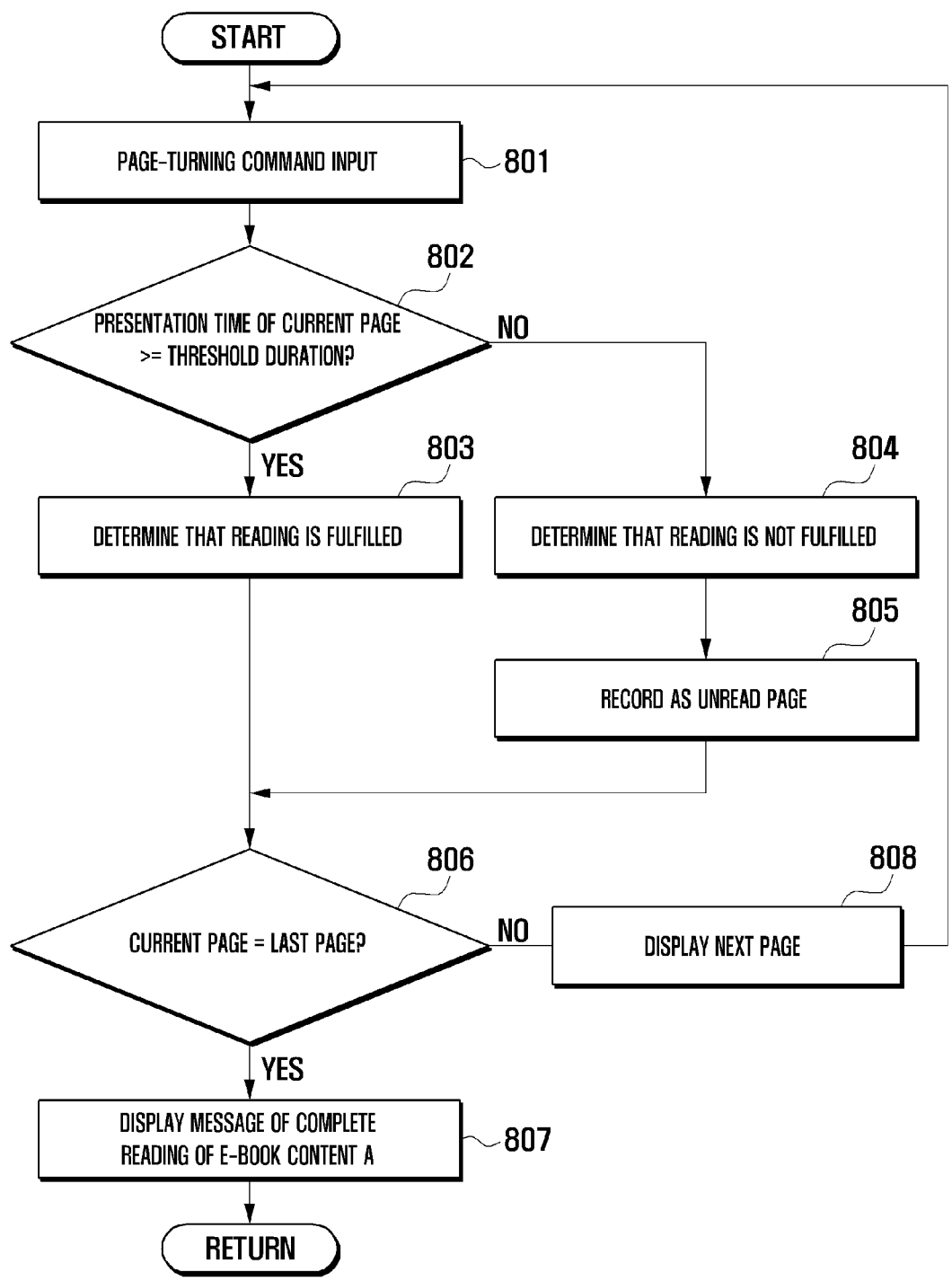
FIG. 8 is a flowchart illustrating details of step 705 for determining user's reading fulfillment in FIG. 7 according to an embodiment of the present invention.

FIG. 8 is a flowchart illustrating details of step 705 for determining user's reading fulfillment in FIG. 7 according to an embodiment of the present invention. FIG. 8 shows the embodiment of the procedure for determining the user's reading fulfillment is by measuring the time for which the page of the e-book is opened.

The control unit 160 detects the page-turning command input by means of the input unit 140 in step 801. Typically, the user inputs the page-turning command by means of the input unit 140 after reading the corresponding page completely.

The control unit 160 determines whether the current time displayed on the current page is greater than a threshold value in step 802. Since it takes a certain length of time for the user to read a page, the control unit 160 defines a threshold time duration and determines whether the time for which the page is opened is greater than the threshold time duration. Since the number of letters of pages may differ among each other, the control unit 160 can set the threshold time durations of the pages to different values and compares the page open time per page with the page-specific threshold time duration to determine the user's reading fulfillment.

If it is determined that the current time displayed on the current page is greater than or equal to the threshold value at step 802, the control unit 160 verifies the user's reading fulfillment in step 803 and then determines whether the current page is the last page in step 806. If the current page is the last page, this means that there is no further page to read and thus the control unit 160 controls the display unit 150 to display a message notifying of the finish of reading the e-book content A in step 807. If it is determined that the user has perused the e-book content A, the control unit 160 controls the display unit 150 to display a message notifying of the completion of reading the e-book content A. If it is determined that the user has not perused the e-book content A, the control unit 160 controls the display unit 150 to display the page numbers of the pages that are not perused by the user. The user can navigate to the corresponding page to peruse.

If it is determined that the current time displayed on the current page is less than the threshold value at step 802, the control unit 160 determines that the user's reading is not fulfilled in step 804 and records and stores the corresponding page as an unread page in the storage unit 130 in step 805. Next, the control unit 160 determines whether the current page is the last page of the e-book content A in step 806.

If the current page is not the last page of the e-book content A, the control unit 160 controls the display unit 150 to display the next page in step 808 and returns the procedure to step 801 to monitor the input of the page-turning command. According to an embodiment of the present invention, if the display time of the current page is less than the predetermined threshold time, the control unit 160 controls the display unit 150 to maintain the current display state without turning the page.

Figure 9:
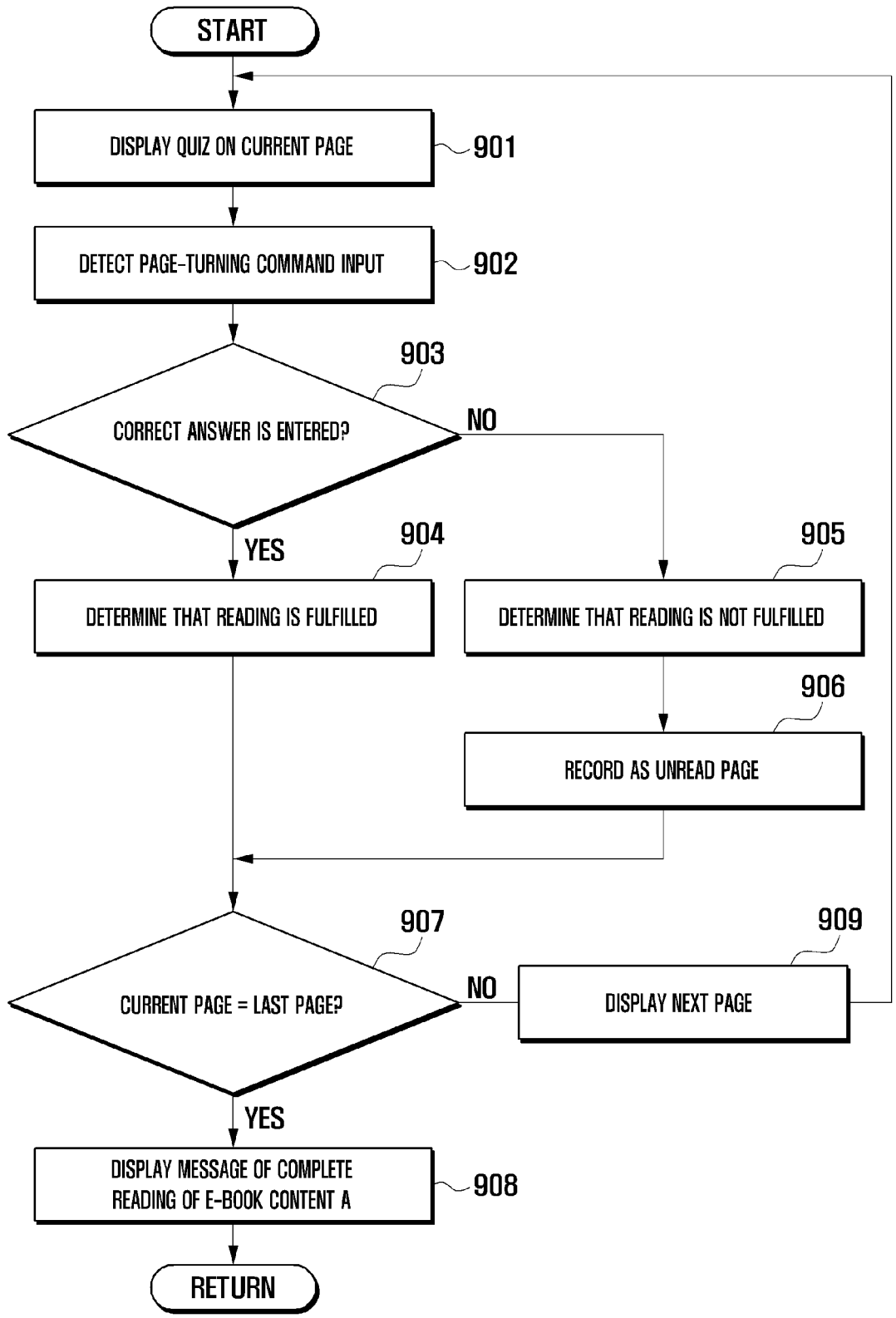
FIG. 9 is a flowchart illustrating details of step 705 for determining user's reading fulfillment in FIG. 7 according to another embodiment of the present invention.

FIG. 9 is a flowchart illustrating details of step 705 for determining user's reading fulfillment in FIG. 7 according to another embodiment of the present invention. In the embodiment of FIG. 9, a quiz is provided to the user, while the user is reading the e-book content A, to verify the user's reading fulfillment based on the answer entered by the user in response to the quiz.

The control unit 160 controls the display unit 150 to display the quiz on the current page in step 901. The e-book content A can be configured such that all or some of the pages are displayed with the quiz. The quiz also can be configured to be displayed per page, paragraph, or chapter. The quiz can be provided with one or more items. The quiz can be provided in the form of a subjective question or objective question. If the current page has a link to a quiz, the control unit 160 controls the display unit 150 to display the page of the e-book content A with the quiz.

The control unit 160 detects a page-turning command input by means of the input unit 140 in step 902. Typically, the user inputs the page-turning command by means of the input unit 140 after reading the corresponding page completely. According to an embodiment of the present invention, if the page-turning command is input through the input unit 140, the control unit 160 controls the display unit 150 to display a quiz.

The control unit 160 determines whether the answer entered by the user is correct in step 903. The user can enter an answer to the quiz by means of the input unit 140. The control unit 160 detects the input of the answer input through the input unit 140 and determines whether the answer is correct.

If it is determined that the answer input by the user is correct at step 903, the control unit 160 verifies the user's reading fulfillment in step 904 and determines whether the current page is the last page in step 907. If the current page is the last page, this means that there is no further page to read and thus the control unit 160 controls the display unit 150 to display a message notifying of the finish of reading the e-book content A in step 907. If it is determined that the user has perused the e-book content A, the control unit 160 controls the display unit 150 to display a message notifying of the completion of reading the e-book content A. If it is determined that the user has not perused the e-book content A, the control unit 160 controls the display unit 150 to display the page numbers of the pages that are not perused by the user. The user can navigate to the corresponding page to peruse.

If it is determined that the answer input by the user is not correct at step 903, the control unit 160 determines that the user's reading is not fulfilled in step 905 and records and stores the corresponding page as an unread page in the storage unit 130 in step 906. Next, the control unit 160 determines whether the current page is the last page of the e-book content A in step 907.

If the current page is not the last page of the e-book content A at step 907, the control unit 160 controls the display unit 150 to display the next page in step 909 and returns the procedure to step 901 to display the quiz of the corresponding page. According to an embodiment of the present invention, if the answer entered by the user is not correct, the control unit 160 can maintain the current page with the quiz without turning to the next page.

Figure 10:
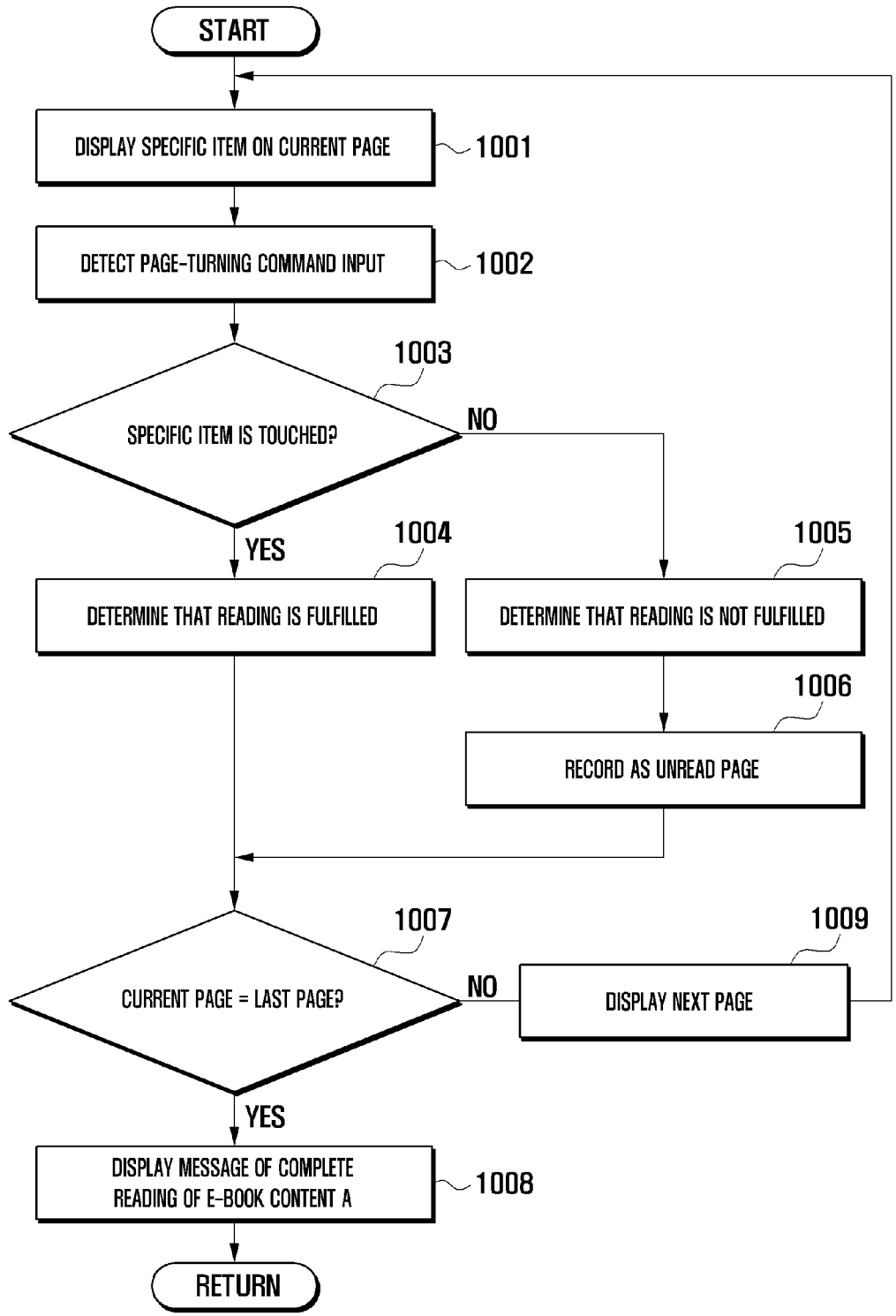
FIG. 10 is a flowchart illustrating details of step 705 for determining user's reading fulfillment in FIG. 7 according to still another embodiment of the present invention.

FIG. 10 is a flowchart illustrating details of steps 705 for determining user's reading fulfillment in FIG. 7 according to still another embodiment of the present invention. In the embodiment of FIG. 10, a specific item is displayed on the page while the user is reading the e-book content A, to verify the user's reading fulfillment based on whether the user makes an accurate touch to the specific item.

The control unit 160 controls the display unit 150 to display a specific item on the current page in step 1001. The e-book content A can be configured such that all or some of the pages have a specific item. The specific item can be set per page, paragraph, or chapter. The specific item can be displayed at the center of a page, end of a page, end of a paragraph, or end of a chapter. The specific item can be an image in shape of an star or a circle. If it is determined that the current page linked to a specific item, the control unit 160 controls the display unit 150 to display the page of the e-book content A along with the specific item.

The control unit 160 detects the page-turning command input by means of the input unit 140 in step 1002. Typically, the user inputs the page-turning command by means of the input unit 140 after reading the corresponding page completely. According to an embodiment of the present invention, if the page-turning command is input through the input unit 140, the control unit 160 controls the display unit 150 to display the specific item.

The control unit 160 determines whether the user makes an accurate touch onto the specific item in step 1003. The user can touch the specific item by means of the input unit 140 when the input unit 140 includes a touch sensor.

If it is determined that the user makes an accurate touch onto the specific item by means of the input unit 140, the control unit 160 verifies the user's reading fulfillment in step 1004 and determines whether the current page is the last page in step 1007. If the current page is the last page, this means that there is no further page to read and thus the control unit 160 controls the display unit 150 to display a message notifying of the finish of reading the e-book content A in step 1008. If it is determined that the user has perused the e-book content A, the control unit 160 controls the display unit 150 to display a message notifying of the completion of reading the e-book content A. If it is determined that the user has not perused the e-book content A, the control unit 160 controls the display unit 150 to display the page numbers of the pages that are not perused by the user. The user can navigate to the corresponding page to peruse.

If it is determined that the touch made by the user is not accurate onto the specific item at step 1003, the control unit 160 determines that the user's reading is not fulfilled in step 1005 and records and stores the corresponding page as an unread page in the storage unit 130 in step 1006. Next, the control unit 160 determines whether the current page is the last page of the e-book content A in step 1007.

If the current page is not the last page of the e-book content A at step 1007, the control unit 160 controls the display unit 150 to display the next page in step 1009 and returns the procedure to step 1001 to display the specific item on the corresponding page. According to an embodiment of the present invention, if the touch made by the user onto the specific item is not accurate, the control unit 160 can maintain the current page with the specific item without turning to the next page.

Figure 11C:
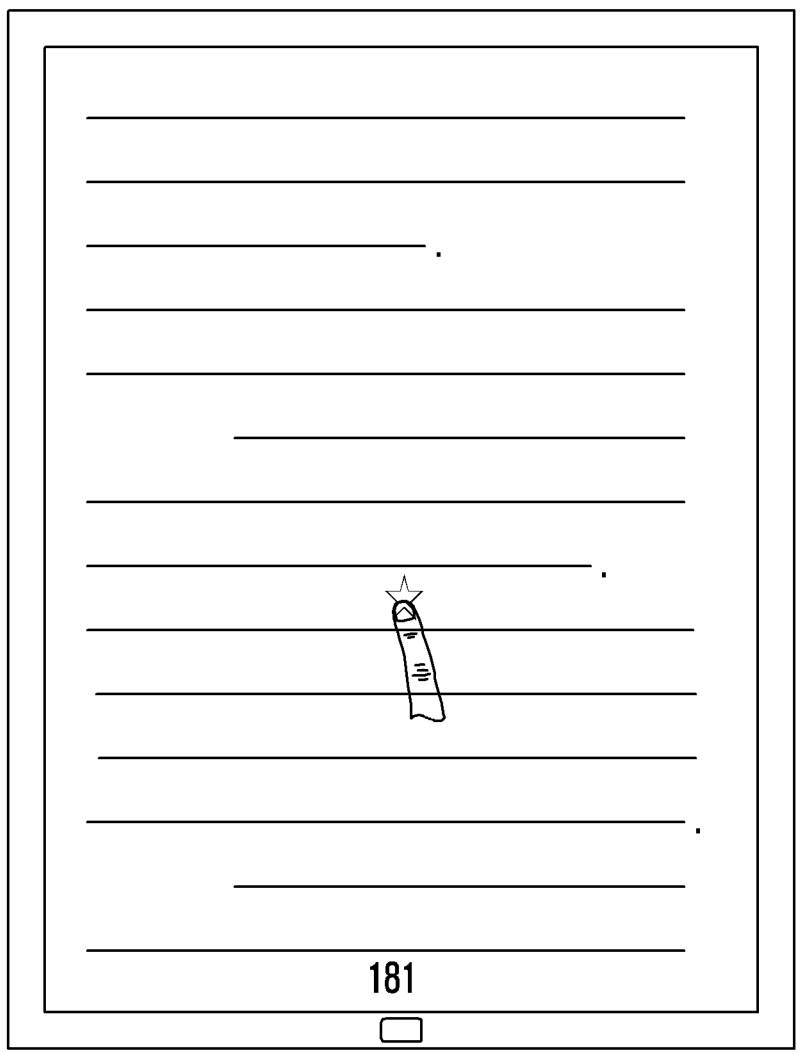

FIG. 11C shows the execution screen of the e-book content A in which the specific item is presented on the page. In FIG. 11C, the user is making a touch to the item having the shape of star which is displayed at the center of the page. If the user inputs the page-turning command after making a touch to the star item, the next page is displayed and, otherwise if the user inputs the page-turning command without touching the star item, the current page is maintained without turning to the next page.

According to an embodiment of the present invention, when the e-book content is executed, the control unit 160 controls the display unit 150 to display a specific word as highlighted. If the user makes a touch to the highlighted word, the control unit 160 controls the display unit 150 such that the word is transformed into an item for a character. The control unit 160 also can control the display unit 150 to display the character along with a number of items such that the user can check how many items are collected.

When the e-book content is initially executed, the page is turned, or the chapter or paragraph is change, the control unit 160 can control the display unit 150 to display a keyword and determine whether the user makes an accurate touch to the keyword by means of the input unit 140. If the user makes an accurate touch to the keyword, the keyword can be transformed into an item to be carried by the character. The control unit 160 can also verify the user's reading fulfillment based on whether the user has made an accurate touch to the keyword.

According to an embodiment of the present invention, the provider server 200 can provide a character ranking service. The mobile terminals send the characters promoted in rank to the provider server, and the provider server 200 determines the ranks of the characters and opens the ranks to the mobile terminals connected to the provider server 200. The provider server 200 can determine the ranks in order of the amount of readings and per genre. The rank information provided by the provider server 200 can include character images, number of read e-books, and genres.

According to an embodiment of the present invention, when the application using profile images such as a social network application is executed, the control unit 160 of the mobile terminal 100 can control such that the character is automatically registered as the profile image. The mobile terminal user can enjoy reading as a hobby and search for friends interested in the same genre with the character displayed as the profile image.

According to the present invention, the user can enjoy various activities such as collecting characters, promoting character level, and uploading character as well as reading e-books and be motivated to read e-book by the collected characters and promotion of the character levels, resulting in improvement of reading habit.

While the invention has been shown and described with reference to certain embodiments thereof, it will be understood by those skilled in the art that various changes in form and detail may be made therein without departing from the spirit and scope of the invention as defined in the appended claims.

What is claimed is:

1. A method for providing content in a mobile terminal, comprising:
   receiving an electronic book from a provider server;
   transmitting a character request message containing identity information of the electronic book to the provider server;
   receiving character information corresponding to the identity information from the provider server;
   displaying an avatar character according to the character information; and
   outputting an event by means of the avatar character, when a page contains a link to the event, and presenting supplementary information by means of the avatar character.

2. The method of claim 1, further comprising:
receiving information related to the electronic book from the provider server; and
outputting the electronic book-related information by means of the avatar character.

3. The method of claim 1, further comprising:
receiving a delete command input for deleting the electronic content;
displaying a message asking whether to delete the character information;
deleting, when a character information delete command is input, the character information; and
maintaining, when a character information maintain command is input, the character information.

4. The method of claim 1, wherein the identity information of the electronic book includes an Internal Standard Book Number (ISBN).

5. The method of claim 1, wherein outputting comprises:
turning to a page in response to a user input; and
displaying, when determining that a current page has the supplementary information to be displayed in addition to content of the electronic book, the supplementary information by means of the avatar character.

6. A method for providing content in a system including a provider server, an electronic book content database, a character database, and a mobile terminal, comprising:
requesting, by the mobile terminal, the provider server for an electronic book;
transmitting, by the provider server, the electronic book retrieved in the electronic book content database to the mobile terminal;
transmitting, by the mobile terminal, a character request message containing identity information of the electronic book to the provider server;
transmitting, by the provider server, character information corresponding to the identity information to the mobile terminal, the character information being retrieved from the character database; displaying, when the electronic book is executed, an avatar character according to the character information, and
presenting, by the mobile terminal, supplementary information by means of the avatar character.

7. The method of claim 6, further comprising:
displaying, when determining that a current page has the supplementary information to be displayed in addition to content of the electronic book, the supplementary information by means of the avatar character.

8. The method of claim 6, further comprising:
determining, by the provider server, whether electronic book-related information is updated;
transmitting, when the electronic book-related information is updated, the updated electronic book-related information to the mobile terminal; and
displaying, by the mobile terminal, the updated electronic book-related information by means of the avatar character.

9. The method of claim 6, further comprising:
determining, by the provider server, whether a delete command for deleting the electronic book is input;
displaying, by the mobile terminal when the delete command is input, a message asking whether to delete the character information; and
deleting/maintaining the character information according to whether the delete command is input.

10. A content provision system comprising:
an electronic book database which stores a plurality of electronic books having unique identity information;
a character database which stores a plurality of avatar characters having the identity information of the electronic books;
a provider server which sends a recipient an electronic book requested by the recipient and retrieved from the electronic book database and a character information corresponding to the identity information, which is transmitted by the recipient, and retrieved from the character database; and
a mobile terminal which downloads the electronic book from the provider server, sends the provider server a character request message including the identity information of the downloaded electronic book, displays, when the electronic book is executed, an avatar character indicated by the character information received from the provider server, and presents supplementary information by means of the avatar character.

* * * * *